(12) United States Patent
Fuller, IV et al.

(10) Patent No.: US 10,065,711 B2
(45) Date of Patent: Sep. 4, 2018

(54) MULTIPLE POSITION BOAT SEAT

(71) Applicant: S2 Yachts Inc., Holland, MI (US)

(72) Inventors: Linwood Addison Fuller, IV, Vero Beach, FL (US); Daniel Edward Cross, Stuart, FL (US); Kenneth Gene Strickland, II, Vero Beach, FL (US)

(73) Assignee: S2 Yachts Inc., Holland, MI (US)

( * ) Notice: Subject to any disclaimer, the term of this patent is extended or adjusted under 35 U.S.C. 154(b) by 9 days.

(21) Appl. No.: 15/415,927

(22) Filed: Jan. 26, 2017

(65) Prior Publication Data

US 2017/0225751 A1   Aug. 10, 2017

Related U.S. Application Data

(60) Provisional application No. 62/291,826, filed on Feb. 5, 2016.

(51) Int. Cl.
| | | |
|---|---|---|
| *B63B 29/04* | (2006.01) | |
| *B60N 2/22* | (2006.01) | |
| *B60N 2/04* | (2006.01) | |
| *A47C 17/165* | (2006.01) | |

(52) U.S. Cl.
CPC ............. *B63B 29/04* (2013.01); *B60N 2/045* (2013.01); *B60N 2/22* (2013.01); *A47C 17/1655* (2013.01); *B63B 2029/043* (2013.01); *B63B 2709/00* (2013.01)

(58) Field of Classification Search
CPC .... B63B 2029/043; B60N 2/14; B60N 2/995; B60N 2/3009; B60N 2/3011; B60N 2/3013; B60N 2/3015; A47C 7/503; A47C 1/143; A47C 17/1655

See application file for complete search history.

(56) References Cited

U.S. PATENT DOCUMENTS

| | | | |
|---|---|---|---|
| 1,355,005 A | 10/1920 | Schecter | |
| 1,412,367 A | 4/1922 | Noack | |
| 1,696,036 A | 1/1929 | Trammell | |
| 2,279,748 A * | 4/1942 | Deak | A47C 1/143 |
| | | | 297/19 |
| 3,594,037 A | 7/1971 | Sherman | |
| 4,460,215 A | 7/1984 | Chamberlain et al. | |
| 4,519,646 A | 5/1985 | Leitermann et al. | |
| 4,679,749 A | 7/1987 | Ryan et al. | |
| 4,902,069 A | 2/1990 | Lehnert | |
| 5,429,414 A | 7/1995 | Olsson et al. | |
| 5,497,724 A | 3/1996 | Brown et al. | |
| 6,647,916 B2 | 11/2003 | Neese et al. | |
| 6,726,279 B1 | 4/2004 | Figel et al. | |
| 6,945,190 B1 | 9/2005 | Frandsen | |
| 7,367,616 B2 | 5/2008 | Summerford | |
| 7,484,804 B2 | 2/2009 | Clauss | |
| 7,661,382 B2 * | 2/2010 | Wood | B60N 2/203 |
| | | | 114/363 |
| 8,113,137 B2 | 2/2012 | Thompson | |

(Continued)

*Primary Examiner* — Andrew Polay
(74) *Attorney, Agent, or Firm* — Honigman Miller Schwartz and Cohn LLP (57) ABSTRACT

A multiple position convertible seat assembly for a boat includes three seat frames pivotally coupled to the boat and to each other to move from a first position as a seat, a second position as a lounge seat with leg support, and a third position forming another seat. In the third position, the seat includes a foldout cushion exposing a work surface.

15 Claims, 10 Drawing Sheets

(56) References Cited

U.S. PATENT DOCUMENTS

| | | |
|---|---|---|
| 9,340,293 B2 | 5/2016 | Guering |
| 2002/0109369 A1 | 8/2002 | Boomhower et al. |
| 2008/0066672 A1 | 3/2008 | Eekhoff et al. |
| 2010/0037814 A1 | 2/2010 | Sahr et al. |
| 2014/0368012 A1 | 12/2014 | Burd |
| 2015/0375644 A1 | 12/2015 | Gratz |
| 2016/0214689 A1 | 7/2016 | Foss et al. |

\* cited by examiner

MULTIPLE POSITION BOAT SEAT

CROSS-REFERENCE TO RELATED APPLICATIONS

This application claims priority under 35 U.S.C. § 119(e) and the benefit of U.S. Provisional Application No. 62/291,826 entitled MULTIPLE POSITION BOAT SEAT, filed on Feb. 5, 2016, by Linwood Addison Fuller IV, et al., the entire disclosure of which is incorporated herein by reference.

BACKGROUND OF THE INVENTION

The present invention relates to a seat for a pleasure boat which can be pivotally converted from a conventional seat to a lounge seat. It can also be moved to additional positions for providing a second seat and a working area associated with an entertainment center of a boat.

Seating designs for boats are particularly challenging for designers inasmuch as typically, at least for relatively small boats, limited space is available for seating. Also, the seating must be fixed to the vessel such that, during movement of the boat, in some cases in turbulent sea conditions, the seating remains in a stable position. In the past, this challenge has been met in numerous ways, including, for example, a fold-out seat as disclosed in U.S. Pat. No. 8,113,137, which is employed to provide either a bolster for the boat's cockpit area or a fold-down comfortable seat. With the advent of increasing creature comforts on boats in the 30 to 35 foot range, consumers are demanding and expecting new features, such as gas grills, entertainment centers, and the like. Although some small boats have had seats which can fold out to form a flat sun pad, this invention relates to a seat which has multiple positions, including a conventional seat, a lounge seat and an extended position in which the seat back can be extended to provide an additional seating surface and provide a work surface in association with an entertainment center.

SUMMARY OF THE INVENTION

A multiple position convertible seat assembly for a boat includes a first seat frame having a pivot coupling at one end for pivotally coupling the frame to a support member of a boat. The first frame includes upholstery positioned on a first side and on an opposite side of the first frame. The first seat frame includes side legs extending at an angle away from the frame. The seat assembly further includes a second seat frame underlying the first seat frame and having a link arm pivotally coupling the second seat frame near one end to the first seat frame at a location spaced from the pivot coupling of the first seat frame to the boat. The second seat frame includes upholstery positioned on the side facing the first seat frame. The assembly further includes a backrest frame having one edge pivotally coupled to the second seat frame along an edge opposite the link arm. The backrest frame includes an opposite edge pivotally coupled to the boat and including upholstery facing the first and second seat frames.

When in a first position, the first seat frame and backrest form a normal seat. The first seat frame can be rotated to an inverted position about the pivot coupling to a second position where the legs of the first seat frame rest on the deck of the boat and the first seat frame forms the leg support of a lounge seat.

The pivot coupling of the second seat frame to the first seat frame and to the backrest frame allows the second seat frame and backrest frame to be pivoted upwardly to a third position in which the second seat frame now defines a backrest, and the backrest frame provides a generally horizontal work surface behind the newly formed seat. The upholstery provided on the backrest frame is pivotally secured to the backrest frame to be pivoted orthogonally to the pivot connection of the backrest frame to the second seat frame to expose a work surface underlying the upholstery.

With such a multi-position seat, therefore, the user has the option of a normal seat, a lounge seat, or, in yet a third position, again a normal seat with a secondary surface providing a work surface behind the seat. Such a seating system can be positioned as an aft-facing seat, such that the backrest frame can, when in the third position, provide a working surface for an entertainment area of the boat and still allow seating adjacent the same area.

These and other features, objects and advantages of the present invention will become apparent upon reading the following description thereof together with reference to the accompanying drawings.

DETAILED DESCRIPTION OF THE PREFERRED EMBODIMENT

Figure 1:
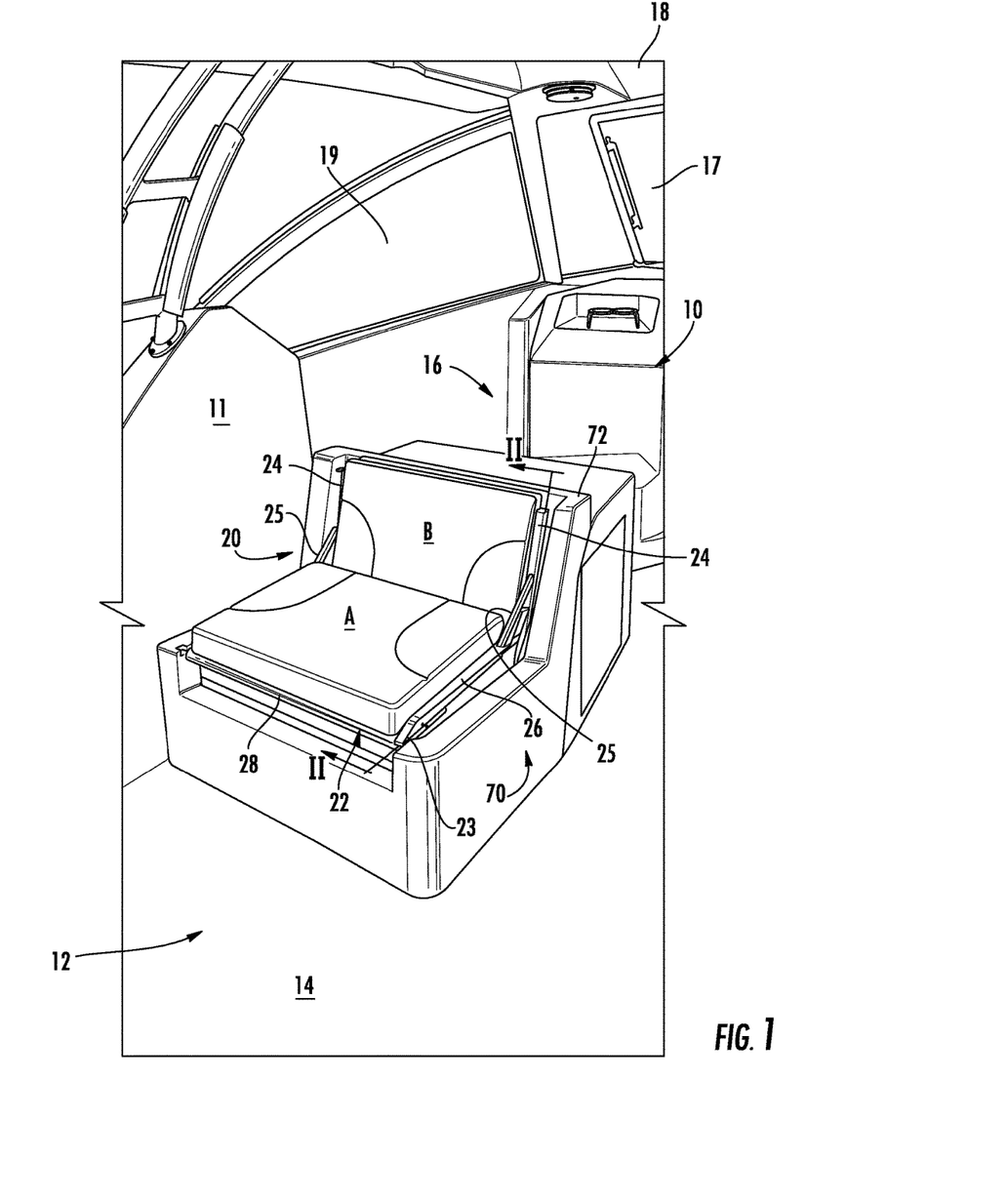
FIG. 1 is a fragmentary perspective view of the cockpit area of a boat, showing the seat of the present invention in a first seating position.

Referring initially to FIG. 1, there is shown a fragmentary perspective view of a boat 10, such as a 29-foot Dual Console Pursuit® Model DC295, which includes a cockpit area 12 having a deck 14, a bridge area 16 forward of the cockpit area 12, an integrated hardtop 18, and front and side windshields 17 and 19, respectively. Conventional bulkheads 11 and supports secure the hardtop 18 and front and side windows 17 and 19. Mounted in the area between the cockpit 12 and the bridge area 16 is the unique seat assembly 20 of the present invention. The seat assembly is pivotally mounted to a fixed integrated fiberglass housing 70, which is either integrally molded with the deck 14 of the boat or otherwise secured to the deck.

Figure 2:
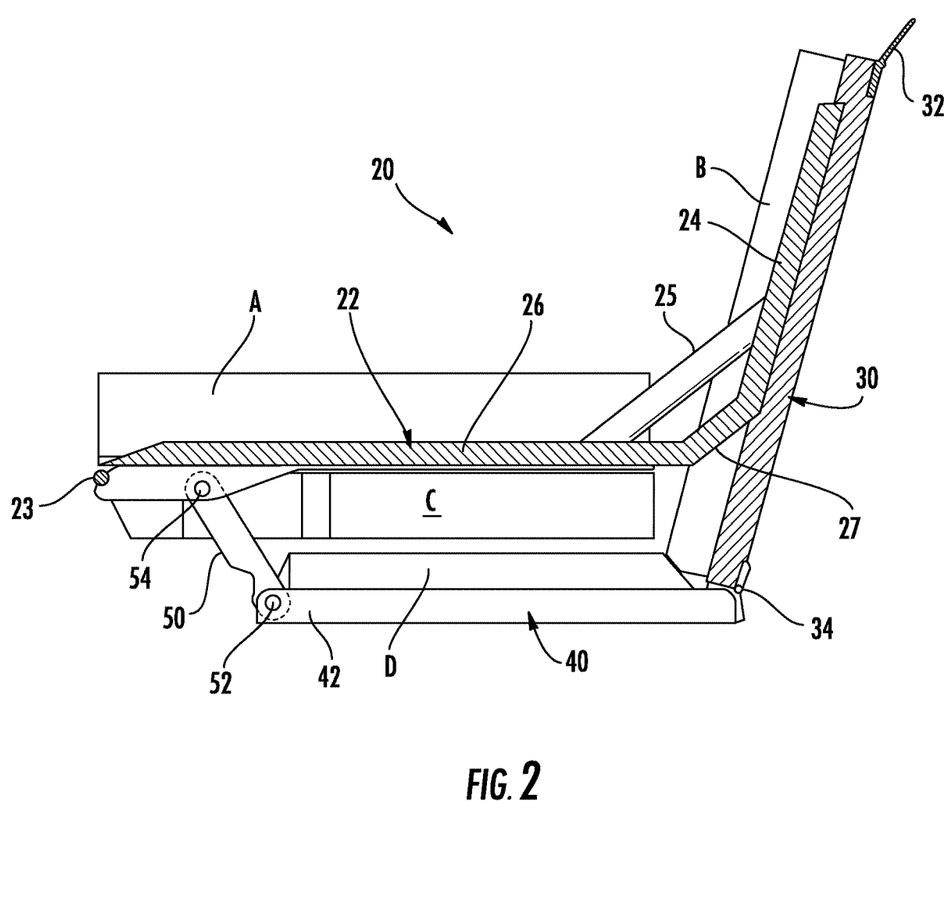
FIG. 2 is a vertical cross-sectional view of the seat components taken along section line II-II in FIG. 1.
Figure 3:
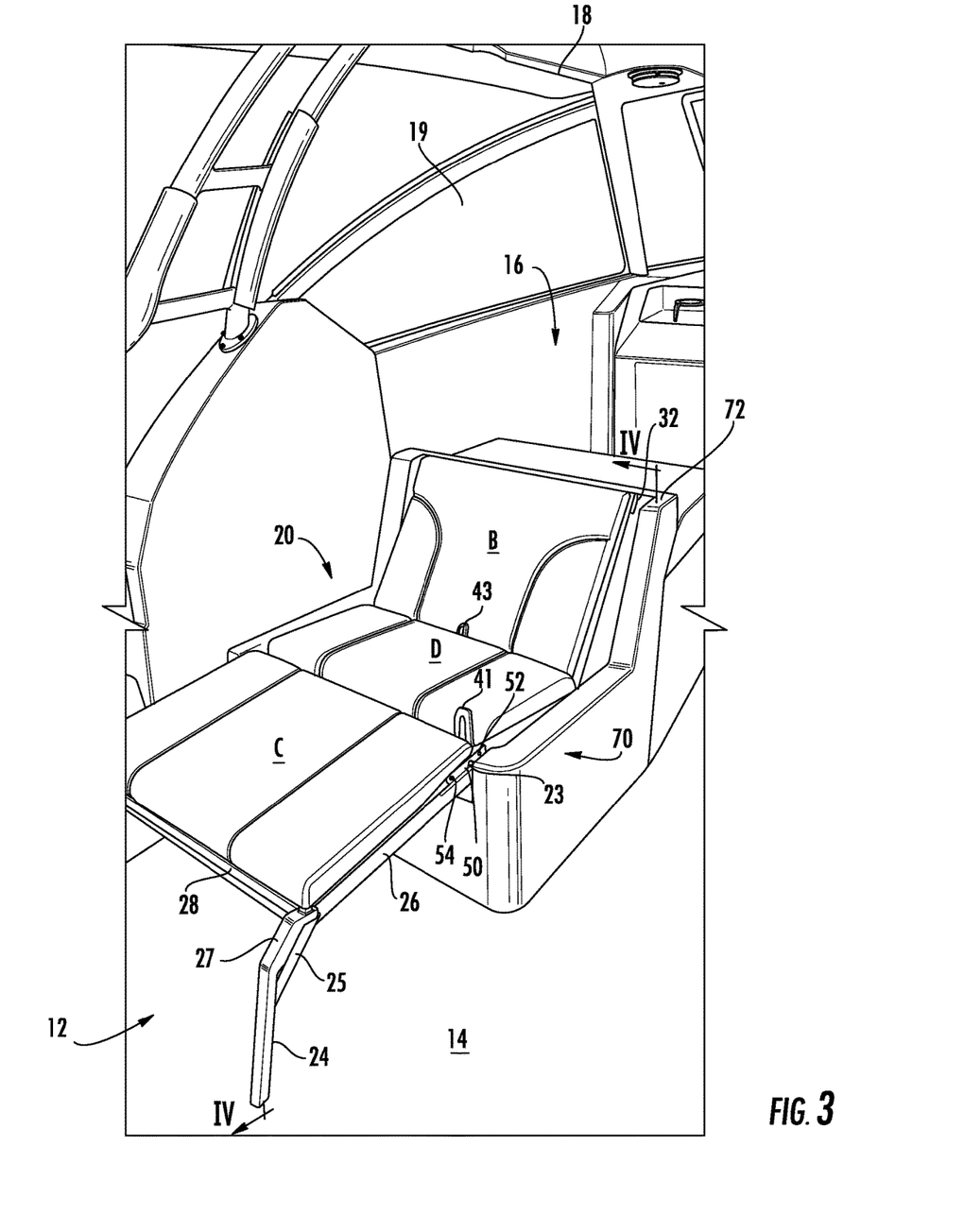
FIG. 3 is a fragmentary perspective view of the boat showing the seat moved to a lounge seat configuration.
Figure 4:
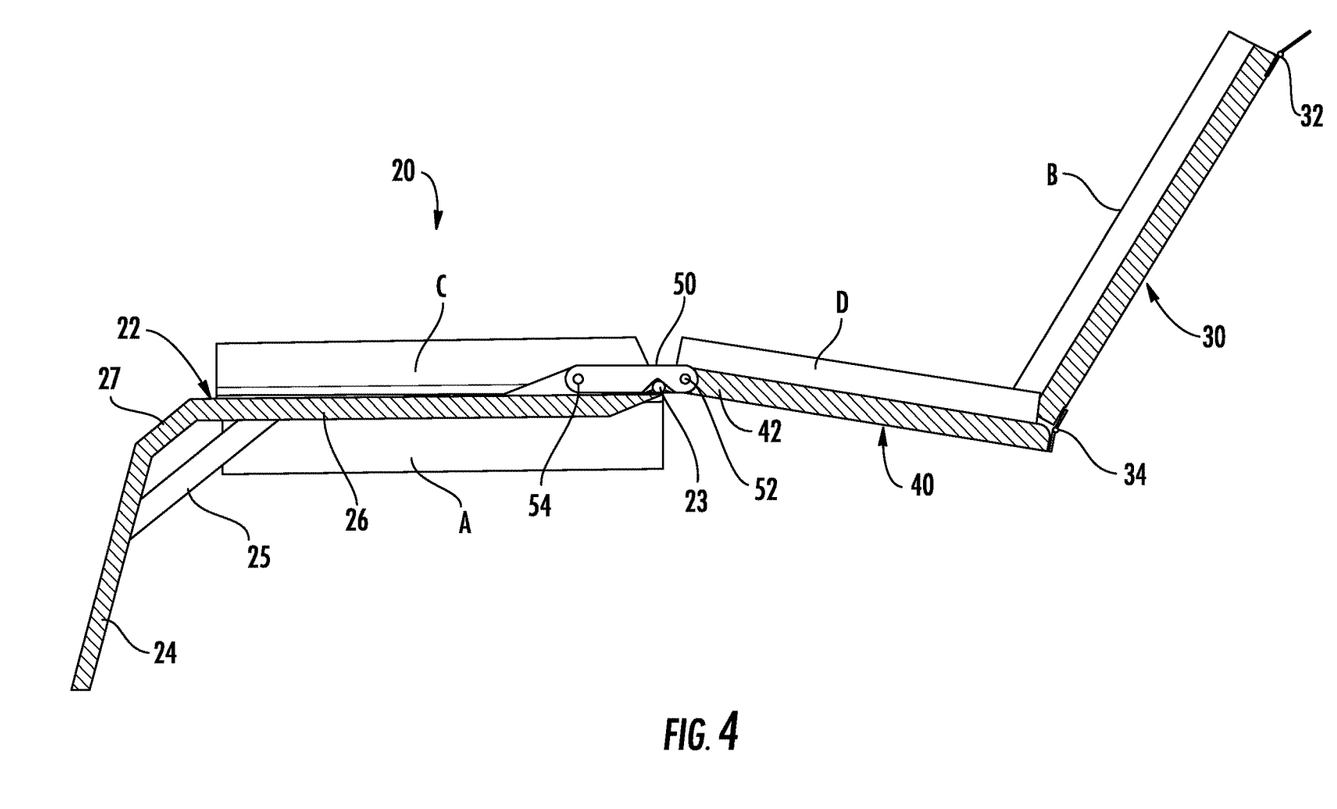
FIG. 4 is a vertical cross-sectional view of the components of the seat shown in the position of FIG. 3 taken along section line IV-IV of FIG. 3.
Figure 9:
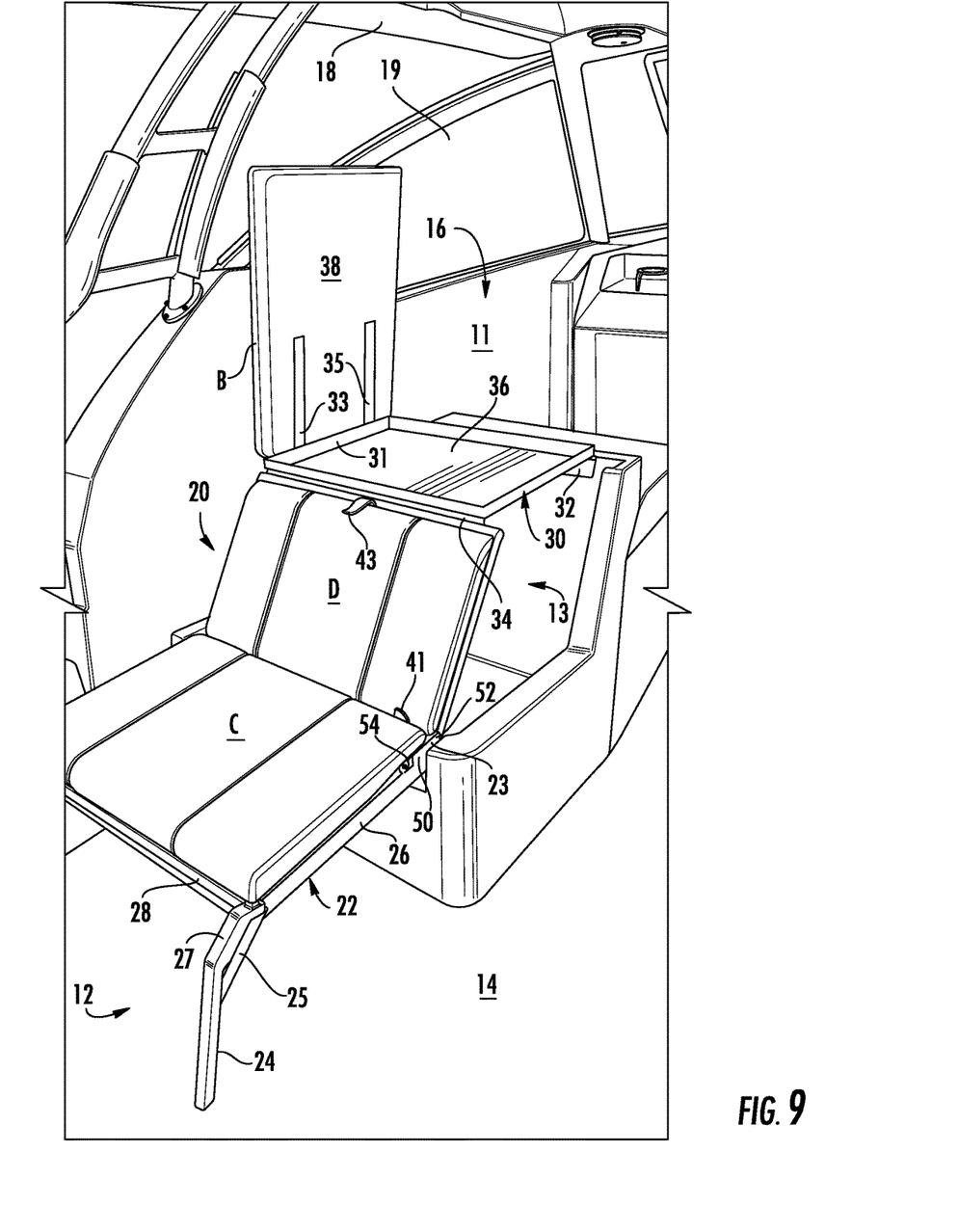
FIG. 9 is a perspective view of the seat shown in the third position with the upholstered backrest moved to a position exposing a work surface.
Figure 10:
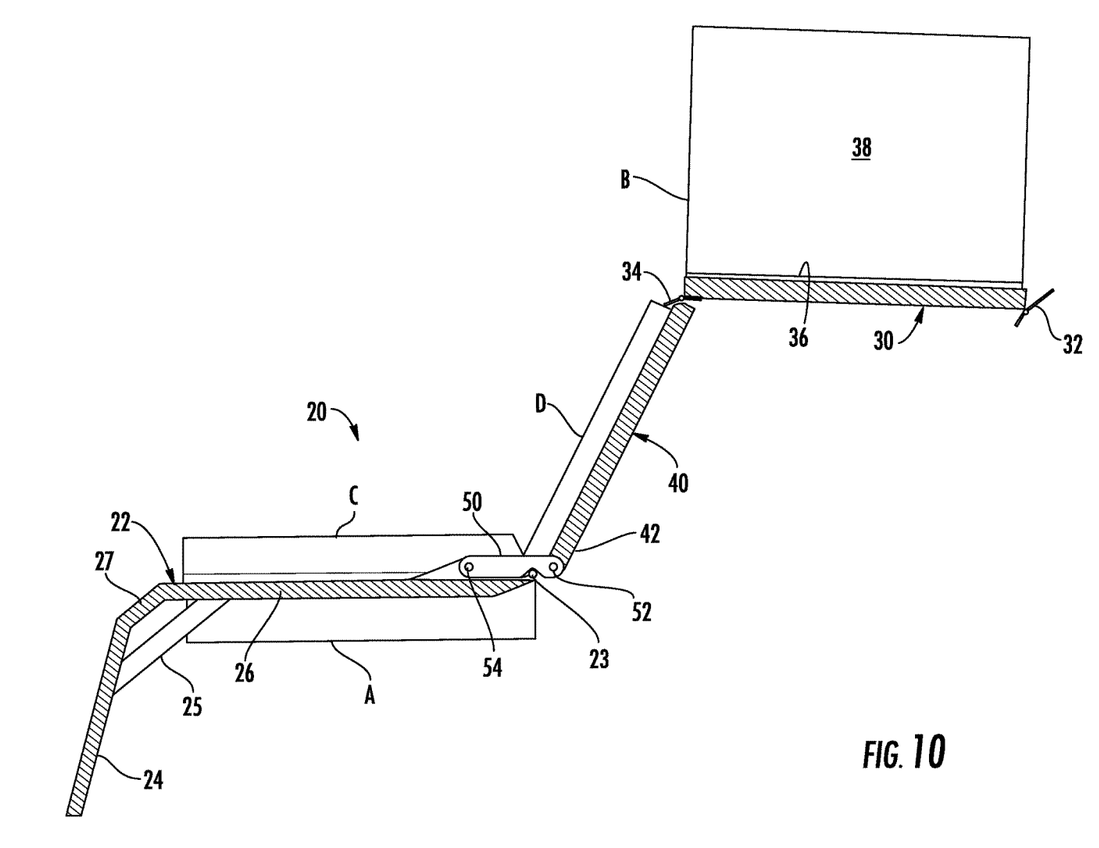
FIG. 10 is a vertical cross-sectional view of the seat with the upholstered backrest pivoted to expose the work surface and taken along the same section line as FIG. 7.

Before describing the details of the construction of the frames and moving sections of the seat assembly 20, a brief overview of the movement of the seat from a conventional seat, as shown in FIGS. 1 and 2, can be seen by the movement of the seat assembly to a lounging position, as seen in FIGS. 3 and 4. With further pivoting movement, as seen in FIGS. 5-8, it can be moved to a third position in which the original seat backrest B becomes a horizontal support surface and the lounge seating area D becomes a backrest. Finally, as illustrated in FIGS. 9 and 10, the upholstery cushion B for the original backrest, as seen in FIG. 1, can be pivoted laterally upwardly to expose a work surface 36 for use by the operator of the boat when the seat assembly 20 is positioned across from or in close proximity to an entertainment center of the boat. This conveniently locates the work surface for use in preparing and serving refreshments. As seen in FIGS. 8 and 9, a significant storage area 13 is also at least temporarily available when the seat is in its third position. Thus, seat assembly 20 can be moved from a first position illustrated in FIGS. 1 and 2 where it serves as a rear-facing bench seat, an extended lounge seat as illustrated in FIGS. 3 and 4, again in a rear-facing seat in its third position shown in FIGS. 7 and 8, and finally exposing a useable work surface and storage area as illustrated in FIGS. 9 and 10.

The seat assembly 20 comprises three separate frame members, including a first seat frame 22 which, as best seen in FIGS. 1 and 2, includes a rectangular base with sides 26 and front and rear supports 28. The rear and outboard sides of the rectangular frame 22 are concealed by the upholstered seat A. The sides 26 each integrally include a first upwardly inclined section 27 (FIG. 2) spanning the backrest cushion B and an upwardly extending ends defining and serving as support legs 24 when the seat is in the lounge position shown in FIGS. 3 and 4. The seat frame 22 is pivotally mounted to the housing 70 by pivot axles 23 extending between frame members 26 and the housing on opposite sides of the seat frame. Seat frame 22 defines a generally rectangular frame supporting an upholstery section labeled A which, in a preferred embodiment, is a seat cushion secured to the rectangular frame in a conventional manner by marine fasteners. The frame 22 also includes an angled handle 25 extending between each side 26 of the seat frame 22 and the ends 24 to facilitate rotation of the seat frame 22 about pivot axles 23 to an inverted position (FIG. 3) exposing the cushion C mounted to frame 22 on the side opposite cushion A. The first seat frame rotates about 180° (i.e., from 170° to 190°) to the inverted position depending upon a given installation.

In addition to the seat frame 22, there is provided a backrest frame 30 (FIGS. 2 and 4) which is pivotally mounted to the upper edge 72 of housing 70 by a piano hinge 32 (FIGS. 2-4). The backrest frame 30 is pivotally mounted at its lower end to a secondary seat frame 40 by a second piano hinge 34, as best seen in FIG. 2. Seat frame 40 underlies frame 22 when in the position shown in FIGS. 1 and 2. Each of the frames 22, 30, and 40 are made of stainless steel and comprise generally rectangular frames, including side, front, and rear tubular members welded in a conventional manner to withstand a marine environment, as are the hinges and other metallic parts of the seat assembly 20.

The secondary seat frame 40 supports an upholstered member such as a cushion D which, when the seat is in the lounge position as illustrated in FIGS. 3 and 4, becomes the seating surface. Interconnecting links 50 are pivotally coupled at one end by pivot axles 52 to the forward end of sides 42 of frame 40 on opposite sides of the frame and are pivotally mounted by pivot axles 54 to the sides 26 of frame 22 at a position spaced from the pivot axles 23 of the seat frame 22 to housing 70. This link allows the seat frame 22 to be pivoted and provide clearance for the secondary seat frame 40 and cushion D, as illustrated in FIG. 4. Thus, in the second position of the seat as illustrated in FIGS. 3 and 4, the reverse side of the seat frame 22 presents a cushion for the legs of the user while the secondary seat frame 40 presents an upholstered surface, such as a cushion D which now forms the seating area or seat. The seat back cushion B mounted to the rectangular backrest frame 30 remains the seat back for the seat assembly when in the lounge position shown in FIGS. 3 and 4. In this position, the upholstered seat back cushion B is inclined rearwardly to present a comfortable seating position. The seat back upholstered surface B is inclined at a slightly greater angle than shown in FIG. 2 as the pivot connection 34 has moved slightly forwardly due to the movement of link 50.

Figure 5:
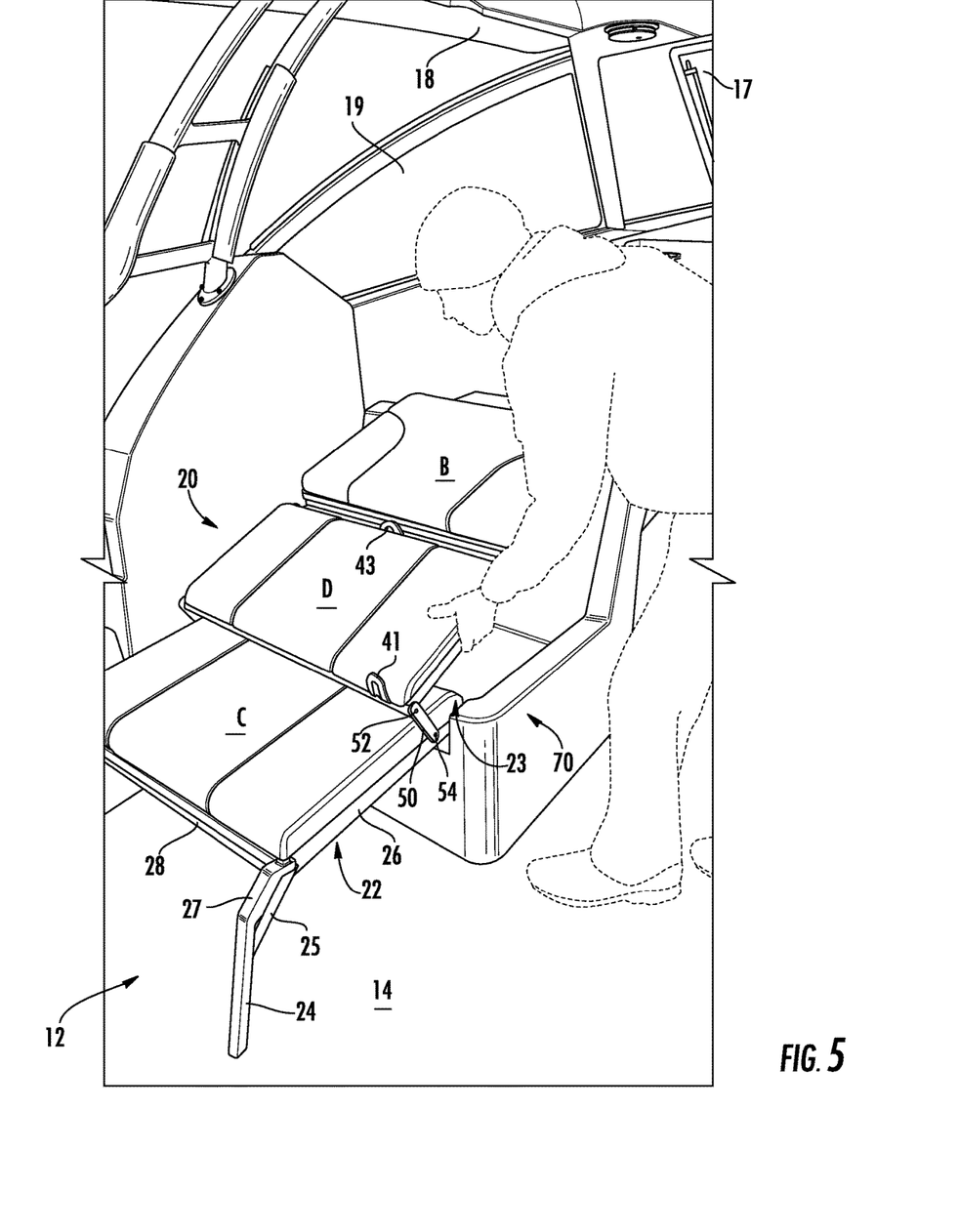
FIG. 5 is a fragmentary perspective view of the boat showing the seat being moved from the lounge position of FIGS. 3 and 4 toward a third position.
Figure 6:
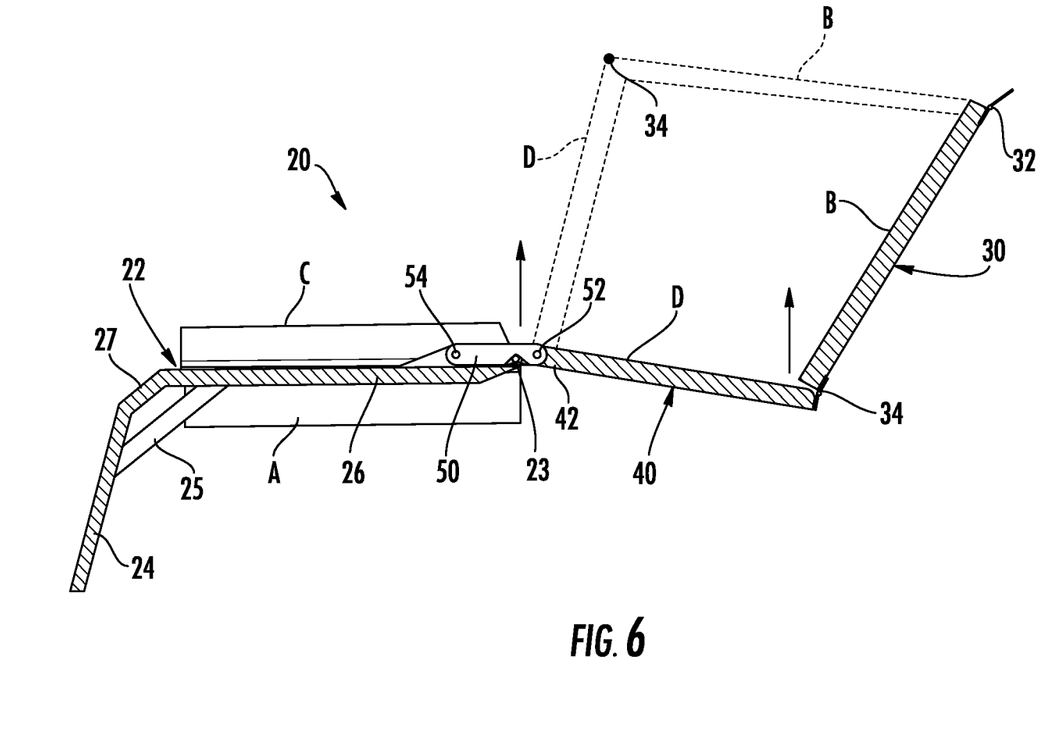
FIG. 6 is a vertical cross-sectional view, partly in phantom form, illustrating the hinged movement of the seat components as illustrated in FIG. 5 and taken along the same section line as FIG. 4.
Figure 7:
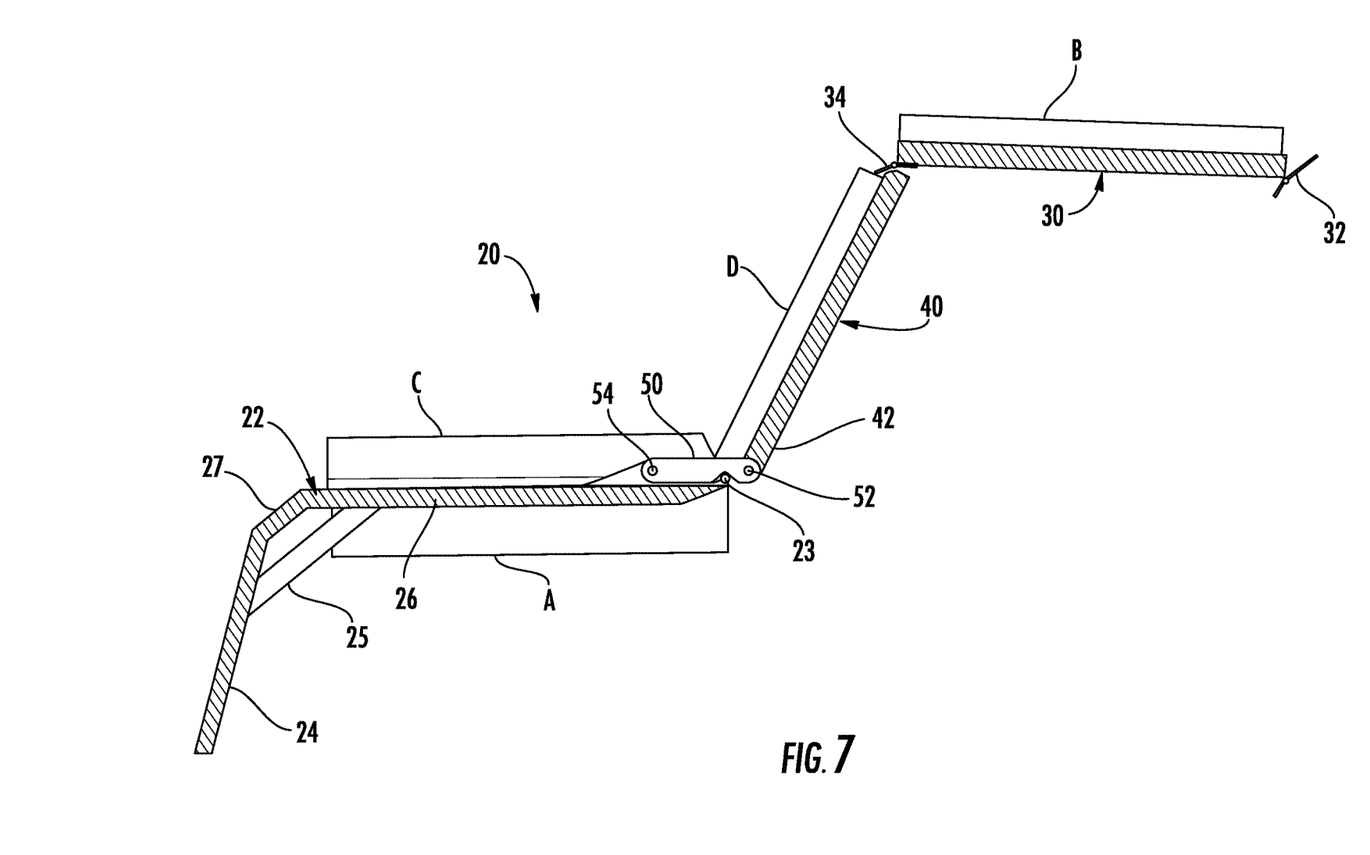
FIG. 7 is a vertical cross-sectional view of the seat shown in the third position taken along the same section line as in FIG. 6.
Figure 8:
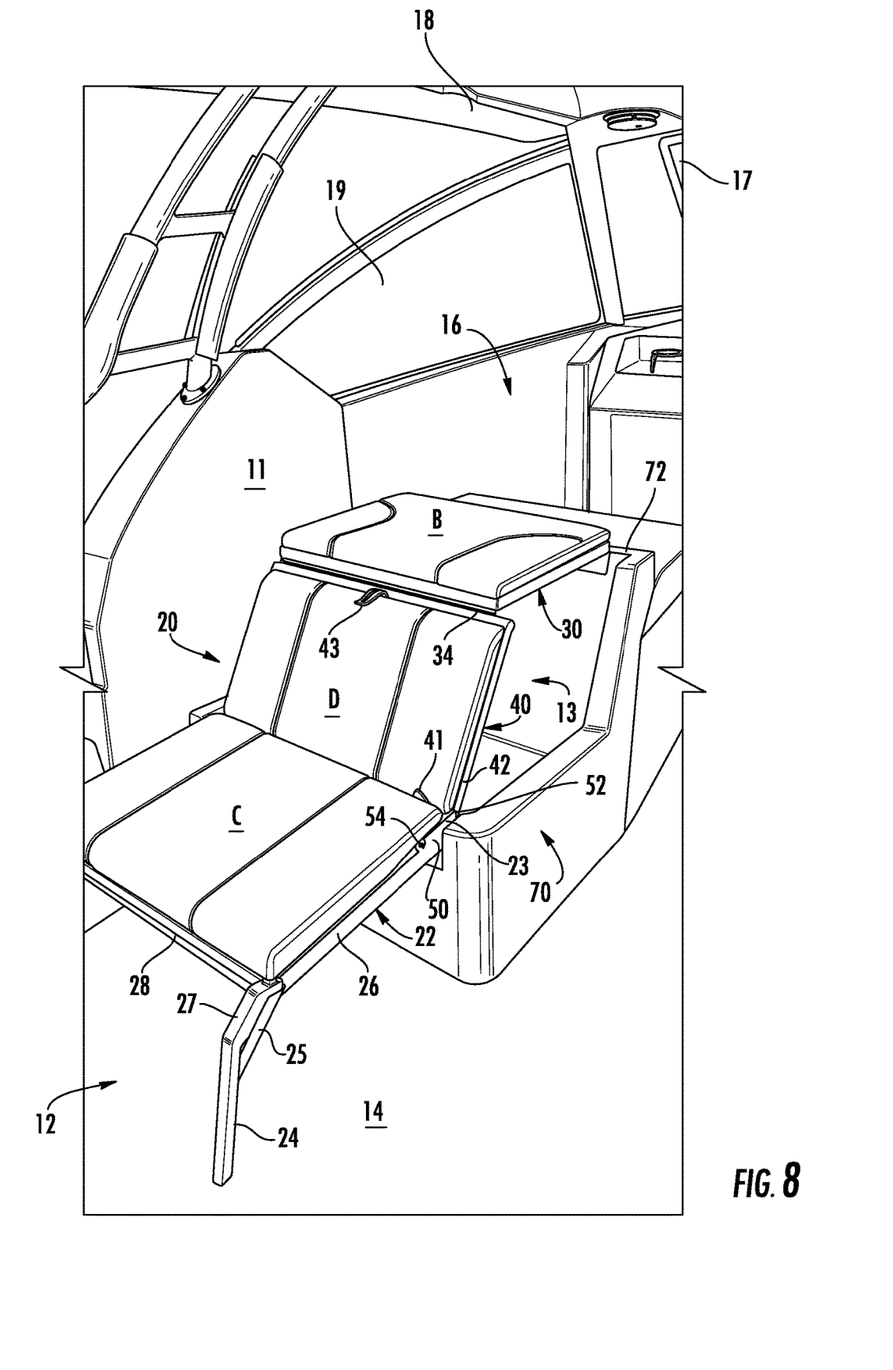
FIG. 8 is a fragmentary perspective view of the boat showing the seat moved to the third position.

Pivot link 50 and the piano hinge pivot 34 between the secondary seat frame 40 and backrest frame 30 allow the secondary seat frame 40 and backrest frame 30 to be raised upwardly, as illustrated in FIGS. 5 and 6, to a third position as illustrated in FIGS. 7 and 8, in which the secondary seat cushion D now becomes the backrest and cushion C the seat. The backrest frame 30, which is pivotally anchored to housing 70 by piano hinge 34 to the top 72 of housing 70, now assumes the generally horizontal position as seen in FIGS. 7 and 8. When in this position, an open storage area 13 is provided above the housing 70 and under backrest frame 30 and cushion B and one which can be employed by the user when the seat is in a position shown in FIGS. 7-10.

The backrest cushion B is mounted by hinges 33 and 35 to the outboard side leg 31 of the rectangular frame 30, as seen in FIG. 9, to allow it to hinge upwardly, as illustrated in FIGS. 9 and 10. The cushion B can be rotated to a generally vertical position (i.e., from about 70° to 110°, and preferably 90°) to expose the work surface 36. Work surface 36 is attached to the frame 30, as shown in FIGS. 9 and 10, such that the backrest frame 30 provides an auxiliary table or work surface 36 for use by the boat operator. Another advantage of the seat design in providing the area 13 under the backrest frame 30 and work surface 36 to be available for temporary use when the seat is in the position seen in FIGS. 9 and 10. The hinges 33 and 35 are friction hinges which hold the cushion panel B, which includes a hard back surface 38, in a position shown in FIGS. 9 and 10, without the need for latches.

Hinges 32 and 34, together with the double pivoted link arm 50 and pivot axles 23 of the seat frame 22 to the housing 70 allows the multiple position movement of the seat sections with relative ease into the variety of positions including the first seating position (FIGS. 1-2), the lounge seating position (FIGS. 3-4), a second seating position (FIGS. 7-10), and the provision of additional storage and a work surface near the galley area of a vessel (FIGS. 9-10). The seat upholstery will typically be padded cushions mounted to a hard surface made of polymeric material typically used in marine cushions. In order to assist in moving the seat from the lounge position shown in FIGS. 3 and 4 to the third position shown in FIGS. 7 and 8, straps, such as straps 41 and 43 (FIG. 5) may be employed as handholds to raise and pivot the auxiliary seat frame 40 to the position shown in FIG. 3.

It will become apparent to those skilled in the art that various modifications to the preferred embodiment of the invention as described herein can be made, including mounting the seat in different areas of a boat and facing different directions as space permits, without departing from the spirit or scope of the invention as defined by the appended claims.

The invention claimed is:

1. A convertible seat assembly for a boat comprising:
a first seat frame having a pivot axle at a first end for pivotally coupling said first frame to a support member of a boat, said first frame having an upholstered member positioned on a first side and on an opposite side of said first frame, said first seat frame including at least one leg spaced from said pivot axle and extending at an angle away from said frame;
a second seat frame underlying said first seat frame and having a link arm pivotally coupling a first end of said second seat frame to said first seat frame at a location spaced from said pivot axle of said first seat frame, said second seat frame having an upholstered member positioned on a side facing said first seat frame; and
a backrest frame having an upholstered member for supporting a user's back whereby said first seat frame can be rotated from a first position to an inverted position about said pivot axle and said link arm rotates to a position between said first seat frame and said second seat frame with said at least one leg of said first seat frame resting on a deck of the boat to form a lounge seat.

2. The assembly as defined in claim 1 wherein said backrest frame is pivotally mounted to said support member and said second seat frame is pivotally mounted to an end opposite said link arm to said backrest frame, such that said second seat frame forms a backrest when said backrest frame and second seat frame are pivoted away from said first seat frame.

3. The assembly as defined in claim 1 wherein said backrest frame is pivotally mounted to said support member of said boat at and an edge remote from said second seat frame and includes a work surface underlying said upholstered member and said upholstered member on said backrest frame is pivotally mounted to said backrest frame to be selectively pivoted to expose said work surface when said backrest frame is pivotally moved to a generally vertical position.

4. The assembly as defined in claim 3 wherein said support member of said boat comprises a housing for receiving said pivot axle of said first seat frame and a hinge for pivotally mounting said backrest frame to said housing at a location spaced from said pivot axle and positioned above said pivot axle.

5. The assembly as defined in claim 4 wherein said first seat frame rotates through about 180° from said first position to said inverted position.

6. The assembly as defined in claim 5 wherein said first seat frame includes a pair of legs extending from opposite edges of said first seat frame.

7. The assembly as defined in claim 6 wherein said upholstered member on each of said frames is a padded cushion.

8. A convertible seat assembly for a boat comprising:
a first seat frame having a pivot axle at a first end for pivotally coupling said first frame to a support member of a boat, said first frame having upholstered member positioned on a first side and on an opposite side of said first frame, said first seat frame including legs extending at an angle away from said frame;
a second seat frame underlying said first seat frame and having a link arm pivotally coupling a first end said second seat frame to said first seat frame at a location spaced from said pivot axle of said first seat frame to said boat, said second seat frame having an upholstered member positioned on a side facing said first seat frame; and
a backrest frame having one edge pivotally coupled to said second seat frame along an edge opposite said link arm, said backrest frame including an opposite edge pivotally coupled to said boat, and including an upholstered member facing said first and second seat frames; whereby said first seat frame and said backrest frame form a seat when in a first position and whereby said first seat frame can be rotated about said pivot coupling axle to a second position and said link arm rotates to a position said between said first seat frame and said backrest frame with said legs of said first seat frame resting on the deck of said boat to form a lounge seat.

9. The assembly as defined in claim 8 wherein backrest frame and said second seat frame can be pivoted away from the deck of the boat to a third position in which said second seat frame becomes a backrest forming a boat seat and said backrest frame extends above and behind said second seat frame.

10. The assembly as defined in claim 9 wherein said backrest frame includes a work surface and said upholstered member associated with said backrest frame is pivotally mounted to said backrest frame to expose said work surface when in said third position.

11. The assembly as defined in claim 10 wherein said upholstered member of said backrest frame is held in a fixed position by at least one friction hinge pivotally mounting said upholstered member to said backrest frame.

12. The assembly as defined in claim 11 wherein said upholstered member on each of said frames is a padded cushion.

13. The assembly as defined in claim 12 wherein said first seat frame rotates through about 180° from said first position to said inverted position.

14. The assembly as defined in claim 13 wherein said first seat frame includes a pair of legs extending from opposite edges of said first seat frame.

15. The assembly as defined in claim 8 wherein said backrest frame is pivotally mounted to said boat at and an edge remote from said second seat frame and includes a work surface and said upholstered member on said backrest frame is pivotally mounted to said backrest frame to selectively expose said work surface when said backrest frame is pivotally moved to a generally horizontal position.

* * * * *

UNITED STATES PATENT AND TRADEMARK OFFICE
CERTIFICATE OF CORRECTION

PATENT NO. : 10,065,711 B2
APPLICATION NO. : 15/415927
DATED : September 4, 2018
INVENTOR(S) : Linwood Addison Fuller, IV et al.

Page 1 of 1

It is certified that error appears in the above-identified patent and that said Letters Patent is hereby corrected as shown below:

In the Claims

At Column 6, Claim number 8, Line number 21, please delete "coupling".

Signed and Sealed this
Thirtieth Day of October, 2018

Andrei Iancu
*Director of the United States Patent and Trademark Office*